(12) United States Patent
Capozella et al.

(10) Patent No.: US 9,098,986 B2
(45) Date of Patent: Aug. 4, 2015

(54) INDICATOR LIGHT INTERPRETATION DEVICE AND METHOD FOR INDICATOR LIGHTS OF AN ELECTRONIC DEVICE

(71) Applicant: ROCKWELL AUTOMATION TECHNOLOGIES, INC., Mayfield Heights, OH (US)

(72) Inventors: Michael Capozella, Cleveland Heights, OH (US); Paul T. Griesmer, Broadview Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 104 days.

(21) Appl. No.: 14/056,531

(22) Filed: Oct. 17, 2013

(65) Prior Publication Data
US 2015/0109136 A1    Apr. 23, 2015

(51) Int. Cl.
*G08B 5/00*    (2006.01)
*G08B 5/36*    (2006.01)

(52) U.S. Cl.
CPC .......................................... *G08B 5/36* (2013.01)

(58) Field of Classification Search
CPC ......................................................... G08B 5/00
USPC ................. 340/815.4, 691.1, 691.6, 679, 6.1, 340/815.45, 815.65, 815.66; 345/618
See application file for complete search history.

(56) References Cited

U.S. PATENT DOCUMENTS

| | | | |
|---|---|---|---|
| 2004/0085443 A1* | 5/2004 | Kallioniemi et al. | ......... 348/135 |
| 2008/0123934 A1 | 5/2008 | Amidi | |
| 2012/0249588 A1 | 10/2012 | Tison et al. | |
| 2012/0259973 A1 | 10/2012 | Windell | |
| 2013/0162811 A1 | 6/2013 | Song et al. | |
| 2015/0048684 A1* | 2/2015 | Rooyakkers et al. | ........... 307/65 |

* cited by examiner

*Primary Examiner* — Toan N Pham (57) ABSTRACT

An indicator light interpretation device and method for indicator lights of an electronic device are provided. The indicator light interpretation device in one example embodiment includes a storage system configured to store one or more device images of an electronic device and a processing system coupled to the storage system, with the processing system configured to process the one or more device images, with the one or more device images including one or more indicator lights, identify the electronic device from the one or more device images, identify one or more indicator lights in the one or more device images, and generate indicated information for the electronic device from the one or more indicator lights.

20 Claims, 6 Drawing Sheets

FIG. 1

NORMAL OPERATION

FIG. 2

ABNORMAL OPERATION

INDICATOR LIGHT INTERPRETATION DEVICE AND METHOD FOR INDICATOR LIGHTS OF AN ELECTRONIC DEVICE

TECHNICAL BACKGROUND

In the field of industrial automation, automated control systems are widely used to control industrial machines and industrial processes. Most industrial machines include computer controls that quickly and reliably control various machines and processes. The computer controls are used to generate control signals that react to measurements and conditions, and therefore ensure that the machines and processes are operating precisely and reliably.

Industrial control systems typically include operator inputs and operator outputs. The outputs can comprise the generation of various operational parameters, including measurements, control settings, and process variables, for example. The outputs are typically display outputs that an operator can visually inspect. The outputs can be generated by display screens or alphanumeric displays, for example. However, text displays and/or display screens are relatively large in size and may not be practical for a small electronic device or small display panel. In addition, such text displays and/or display screens may be relatively expensive and may drive up the cost of the control device.

As a result, it is common that various industrial control devices include indicator lights instead of a text display or display screen. The indicator lights can change in order to convey information about the control device and/or process. The indicator lights can vary in intensity, color, can vary over time, and can vary in patterns that convey information.

OVERVIEW

In an embodiment, an indicator light interpretation device for indicator lights of an electronic device is provided. The indicator light interpretation device locates and analyzes the indicator lights of the electronic device. The indicator light interpretation device generates indicated information for the indicator lights. The indicated information comprises information that is conveyed by the indicator lights. The indicator light interpretation device includes a storage system configured to store one or more device images of the electronic device and a processing system coupled to the storage system, with the processing system configured to process the one or more device images, with the one or more device images including one or more indicator lights, identify the electronic device from the one or more device images, identify one or more indicator lights in the one or more device images, and generate indicated information for the electronic device from the one or more indicator lights.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Indicator lights on a control device may include legends that correspond to the information conveyed by the indicator lights. Unfortunately, any legends that are included on a control panel of a control device can also be small and cryptic, wherein a human operator may have difficulty in understanding the information that the legend and the indicator light were designed to convey. If the operator is already busy, the operator may find it very difficult to accurately and completely determine all information that is being conveyed by the indicator lights. The difficulty is increased where the operator is responsible for monitoring a plurality of control devices, each of which can include a plurality of indicator lights.

An indicator light interpretation device and method for indicator lights of an electronic device are provided herein. The device and method use image processing to identify an electronic device. The device and method use image processing to locate indicator lights of the electronic device. The device and method determine characteristics of the indicator lights. The device and method analyze the characteristics and interpret the indicated information that is being conveyed by the indicator lights. The device and method present the indicated information to a human operator.

Advantageously, the device and method can quickly determine the indicated information. The device and method can reliably determine the indicated information. The device and method can determine complex or hard-to-analyze indicated information, including indicated information that a human operator would need a manual or key to interpret and understand. The device and method can determine indicated information for a wide variety of electronic devices.

Figure 1:
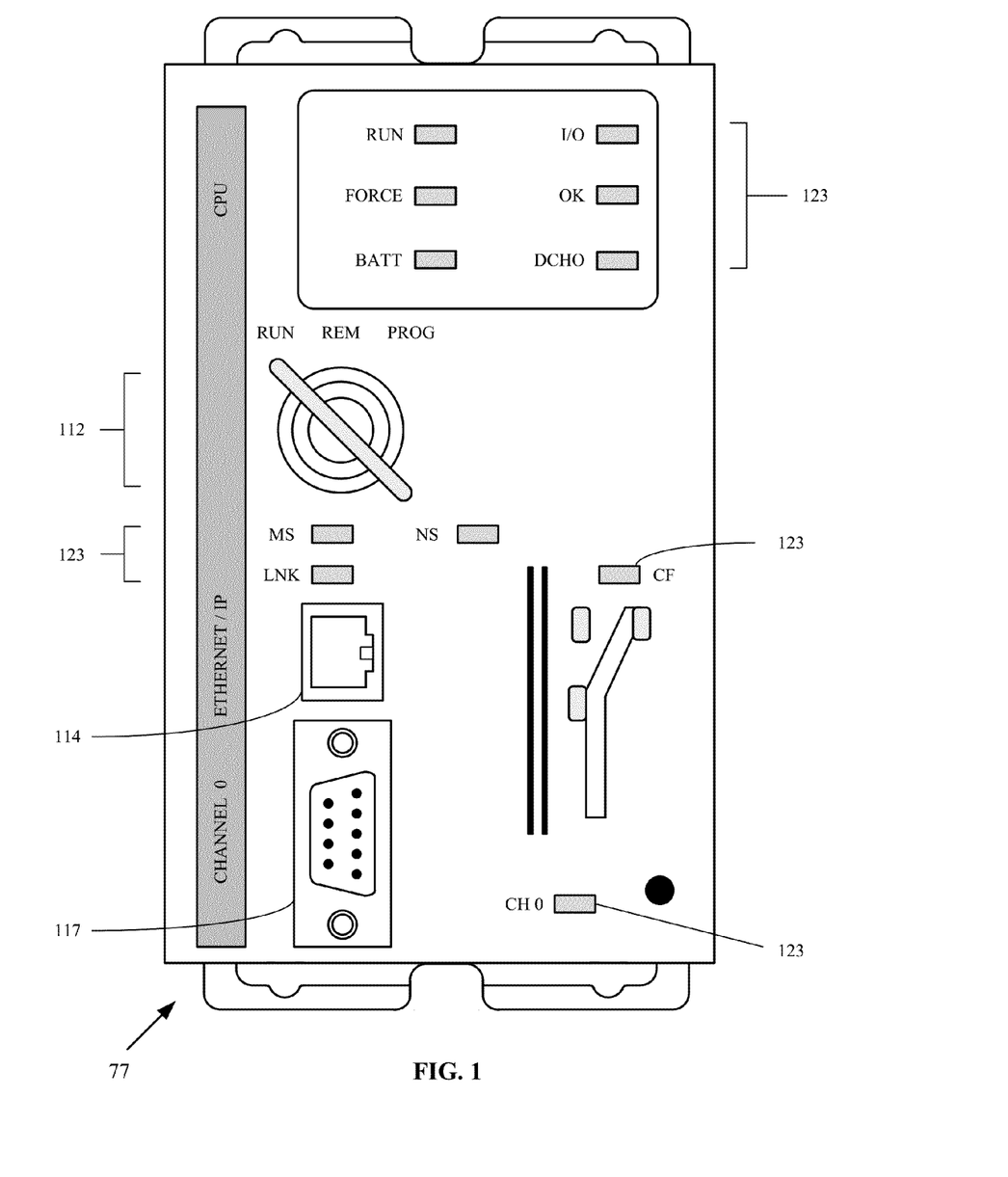
FIG. 1 shows an electronic device including a control panel.

FIG. 1 shows an electronic device 77 including a control panel 111. The control panel 111 can be used by a human operator or technician to inspect the operation of the electronic device 77 and can be used to control the operation. The control panel 111 includes one or more indicator lights 123. The one or more indicator lights 123 can display operational information that can be viewed and interpreted by a human operator or technician.

The control panel 111 can include various input devices, including the selector knob 112. The input devices can further comprise devices such as buttons, switches, touch screens, or other suitable input devices. The control panel 111 can include various output devices, including output devices such as display screens, gauges, indicator windows, and the one or more indicator lights 123. The control panel 111 can include connectors 114 and 117 for coupling the electronic device 77 to cables, wires, optical fibers, or other electrical or optical links, for example. In addition, the control panel 111 may include communication interfaces such as antennas, transceivers, or any other type of wired or wireless communication interfaces.

The control panel 111 may be unique from other control panels on other electronic devices. The various devices on the control panel 111 may vary in size, placement, type, et cetera. The control panel 111 therefore can be identified from the characteristics of the various devices. Further, once the electronic device 77 has been identified, the indicator lights 123 can be identified and analyzed, wherein the image processing can be used to determine information being presented by the indicator lights 123.

The one or more indicator lights 123 can comprise any manner of light-emitting devices, including incandescent, fluorescent, or semiconductor light-emitting devices, such as light-emitting diodes (LEDs), for example. The one or more indicator lights 123 can be arranged at any suitable location or locations on the control panel 111. The one or more indicator lights 123 can be arranged in any suitable pattern or patterns on the control panel 111. The one or more indicator lights 123 can comprise light-emitting devices of any suitable light intensity capability. The one or more indicator lights 123 can comprise light-emitting devices of any suitable color. The indicator lights 123 may be steady or blinking. The lights may change slowly or according to predetermined variation patterns or sequences.

The one or more indicator lights 123 convey information to the viewer. The one or more indicator lights 123 can be configured to convey any suitable information, such as operational information for the electronic device 77. The one or more indicator lights 123 can be configured to convey information such as status information, operational values, measurement values, failure codes or symbols, warning indicators, or other information intended for a human operator or technician.

Figure 2:
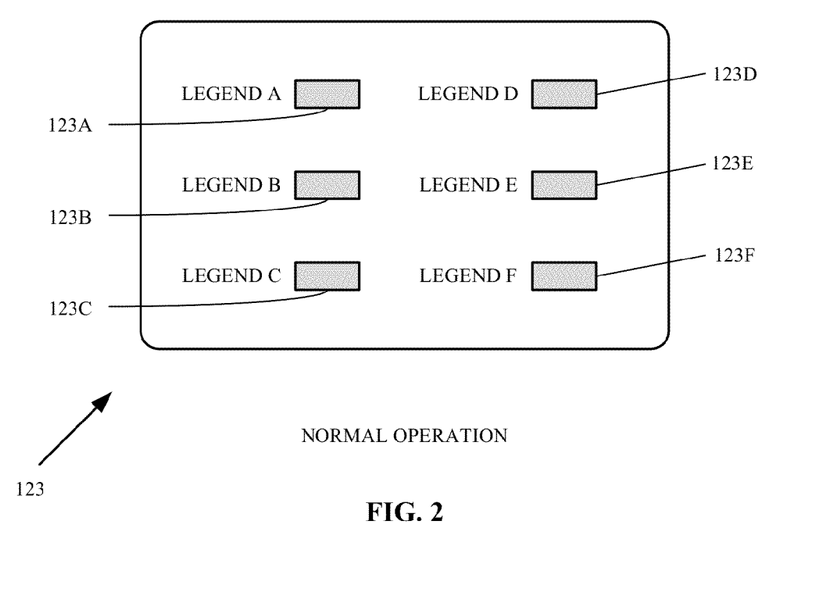
FIG. 2 shows a set of indicator lights in normal operation.

FIG. 2 shows a set of indicator lights 123 in normal operation. The indicator lights 123 comprise six indicator lights 123A-123F that are arranged in a grid in this example. The indicator lights 123 in the example are of a uniform color and/or intensity. The indicator lights 123 may include legends, such as descriptive text and/or symbols, which inform a human operator at least somewhat of what the indicator lights 123 are meant to convey.

Figure 3:
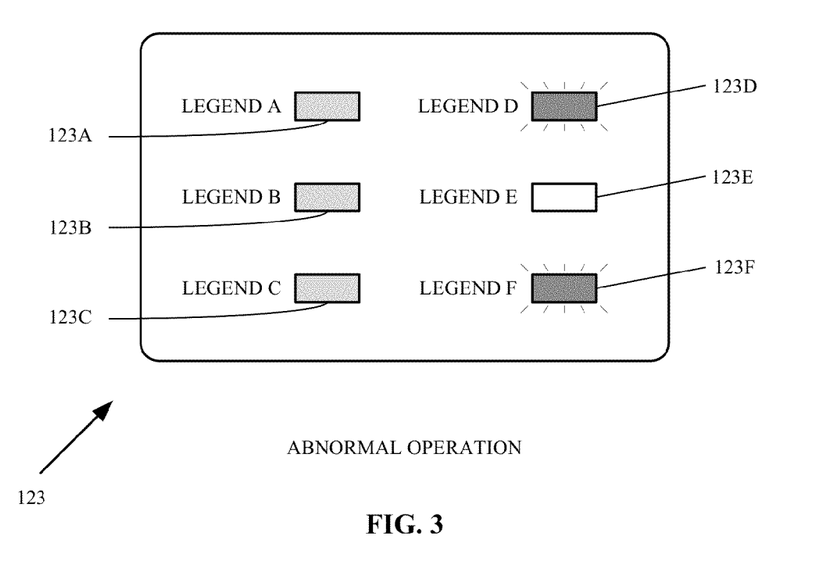
FIG. 3 shows the indicator lights of FIG. 2 but under abnormal or undesired operation of the electronic device.

FIG. 3 shows the indicator lights 123 of FIG. 2 but under abnormal or undesired operation of the electronic device 77. In the figure, the indicator light 123E is non-illuminated or is illuminated at a low intensity. The indicator lights 123D and 123F, in contrast, are illuminated at a higher level than normal. The higher level of illumination can comprise a higher light intensity and/or a different light color, for example.

A change in one of the indicator lights 123A-123F can indicate a change in a status condition or operational status of the electronic device 77. A change in one of the indicator lights 123A-123F can indicate abnormal operation in the electronic device 77. Alternatively, the change in status condition or abnormal operation can be indicated by an overall pattern or combination of indicator light characteristics. Consequently, multiple interpretations of the indicator lights 123 are possible, such as for various combinations of light intensities, colors, and variation sequences. The variation sequences comprise variations in individual indicator lights or variations in groups of indicator lights.

As a result, a human operator may not be able to quickly determine what is being indicated by the indicator lights 123A-123F. A human operator may not be able to reliably or accurately determine what is being indicated by the indicator lights 123A-123F. Therefore, it would be advantageous for the human operator to be able to use image processing technology to automatically determine the information being presented by the indicator lights 123A-123F.

Figure 4:
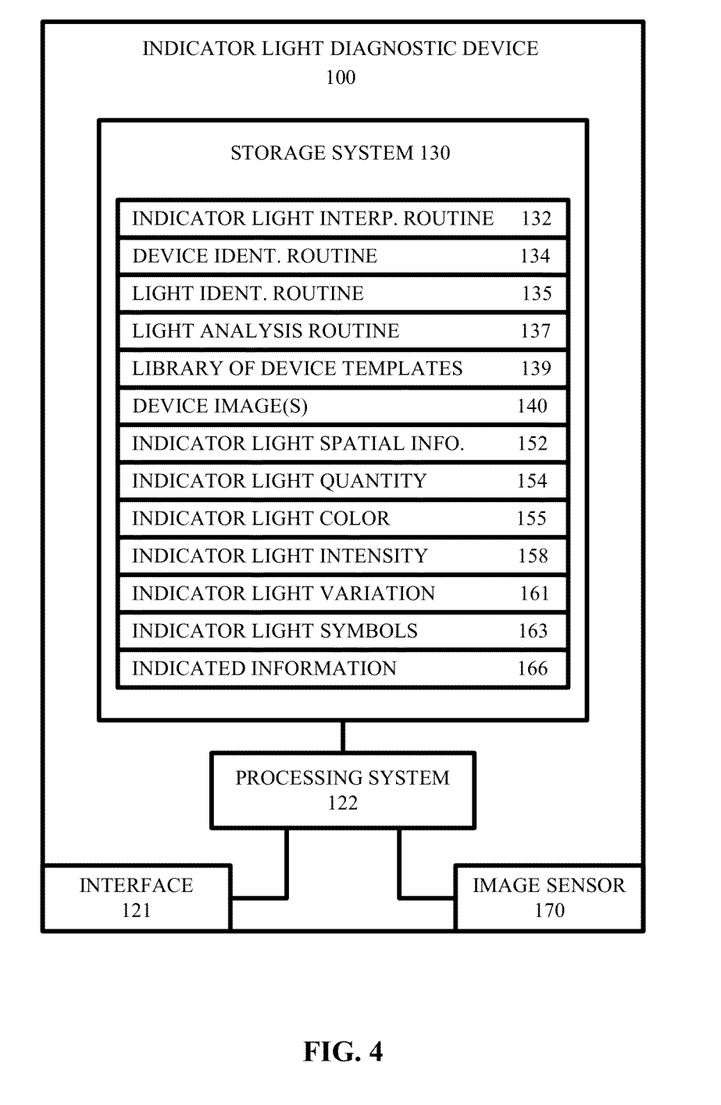
FIG. 4 shows an exemplary indicator light interpretation device for indicator lights of an electronic device.

FIG. 4 shows an exemplary indicator light interpretation device 100 for one or more indicator lights 123 of an electronic device 77. The indicator light interpretation device 100 can be used to analyze the one or more indicator lights 123. The indicator light interpretation device 100 can analyze the one or more indicator lights 123 without assistance from, or interference by, a human operator or technician.

The electronic device 77 in one example comprises an industrial automation device. Consequently, the indicator light interpretation device 100 comprises an industrial automation tool or aid. The indicated information therefore comprises industrial automation indicated information. The indicated information can include information such as machine or process characteristics, machine or process status, machine or process warning conditions, or any other industrial automation information.

The indicator light interpretation device 100 in the example shown includes an interface 121, a storage system 130, and a processing system 122. The processing system 122 is communicatively coupled to the interface 121 and the storage system 130.

The interface 121 in some examples comprises a user interface. Consequently, the interface 121 includes user input devices of any manner, wherein the interface 121 enables a user to make selections, enter inputs or commands, and operate the indicator light interpretation device 100.

Further, the interface 121 includes user output devices of any manner, wherein the interface 121 generates outputs for the user, including visual and audio outputs. For example, the interface 121 can display device images to the user and can display or convey operational information that the indicator light interpretation device 100 has determined from the indicator lights 123 in the device images 140.

Alternatively, or in addition, the interface 121 comprises a communication interface. As a result, the indicator light interpretation device 100 can receive device images from external devices. Further, the indicator light interpretation device 100 can transmit information to external devices, such as a determined status condition of the electronic device 77 as determined by the indicator light interpretation device 100.

The storage system 130 in the example shown stores an indicator light interpretation routine 132, a device identification routine 134, an indicator light identification routine 135, an indicator light analysis routine 137, a library of device templates 139, one or more device images 140, an indicator light spatial relation information 152, an indicator light quantity 154, an indicator light color 155, an indicator light intensity 158, an indicator light variation 161, indicator light symbols 163, and an indicated information 166.

In some examples, the indicator light interpretation device 100 can optionally include an image sensor 170 configured to capture electronic images, wherein the indicator light interpretation device 100 can process the images. Alternatively, or in addition, the indicator light interpretation device 100 can receive and process device images from external devices.

The indicator light interpretation routine 132 comprises an interpretation routine for interpreting information being conveyed by indicator lights in images. The indicator light interpretation routine 132 generates an interpretation of what is being indicated by the indicator lights and stores the interpretation as the indicated information 166.

The indicator light interpretation routine 132 can initiate image processing and analysis. The indicator light interpretation routine 132 can accept images as inputs and can generate an indicator light analysis as an output. The indicator light interpretation routine 132 can invoke other routines as part of the indicator light analysis.

The device identification routine 134 generates a determination of the identity of the electronic device 77 as contained or included in the one or more device images 140. The device identification routine 134 can compare the one or more device images 140 to the library of device templates 139 in order to identify the electronic device 77.

The light identification routine 135 determines the indicator lights in the one or more device images 140. The light identification routine 135 locates and identifies indicator lights in the one or more device images 140 and generates the indicator light spatial information 152. The light identification routine 135 determines both the locations and the spatial relationships of the one or more indicator lights 123 as part of the indicator light spatial information 152. The light identification routine 135 identifies indicator lights in the one or more device images 140 by determining sources of emitted light in the one or more device images 140. The light identification routine 135 can identify indicator lights by extracting indicator light information from a device template used to identify the electronic device 77. The light identification routine 135 determines the shape and outline of the one or more indicator lights 123 within the one or more device images 140. The light identification routine 135 determines the intensities of light emitted by each indicator light of the one or more indicator lights 123. The light identification routine 135 determines the colors of light emitted by each indicator light of the one or more indicator lights 123.

The light analysis routine 137 uses information already determined regarding the one or more indicator lights 123 in order to analyze the information being presented by the one or more indicator lights 123 and generate the indicated information 166. For example, the light analysis routine 137 can determine the quantity of indicator lights. The light analysis routine 137 can determine if individual indicator lights are emitting light. The light analysis routine 137 can determine the intensities of the one or more indicator lights 123. The light analysis routine 137 can determine whether the individual indicator lights of the one or more indicator lights 123 have a greater, equal, or lesser intensity than expected for each indicator light of the one or more indicator lights 123. The light analysis routine 137 can determine whether the intensity of individual indicator lights indicate a normal or abnormal condition. The light analysis routine 137 can determine the colors of the one or more indicator lights 123. The light analysis routine 137 can determine whether the color of individual indicator lights indicate a normal or abnormal condition. Where the one or more device images 140 comprises images captured over time, the light analysis routine 137 can analyze the one or more device images 140 and detect and quantify variations in individual indicator lights.

The library of device templates 139 comprises predetermined device templates that are used to identify an unknown electronic device in the one or more device images 140. The library of device templates 139 may be locally stored within the indicator light interpretation device 100, or may be externally stored and obtained in the one or more device images 140 or remotely consulted by the indicator light interpretation device 100. The one or more device images 140 can be compared to templates in the library of device templates 139 until either the electronic device 77 is matched to a template and identified, or all entries in the library of device templates 139 have been tried without a match.

The one or more device images 140 comprise one or more images taken of the electronic device 77. The one or more device images 140 can be captured by the indicator light interpretation device 100. Alternatively, the indicator light interpretation device 100 can receive the one or more device images 140 from an external source or sources. In some examples, the one or more device images 140 comprise a single image that includes only static information for the one or more indicator lights 123. Alternatively, in other examples, the one or more device images 140 comprise multiple images taken over time, wherein the multiple images capture variations in the one or more indicator lights 123 over time.

The indicator light spatial information 152 comprises spatial information for each indicator light of the one or more indicator lights 123. The indicator light spatial information 152 can be use for identifying the electronic device 77. Alternatively, if the electronic device 77 has already been identified, the device identification can provide the indicator light spatial information 152.

The indicator light quantity 154 comprises a quantity of indicator lights within the one or more device images 140 and the quantity of indicator lights on the electronic device 77. The indicator light quantity 154 can include only the indicator lights that are currently emitting light. Alternatively, the indicator light quantity 154 can include all indicator lights of the one or more indicator lights 123.

The indicator light color 155 comprises light color information for each indicator light of the one or more indicator lights 123. In addition, the indicator light color 155 can include color variation information, such as where a particular indicator light can change color. A change in color, such as from green to yellow to orange to red, for example, can indicate a change in condition or status of the electronic device 77.

The indicator light intensity 158 comprises light intensity information for each indicator light of the one or more indicator lights 123. In addition, the indicator light intensity 158 can include intensity variation information, such as where a particular indicator light can change intensity. A change in intensity, such as from relatively dim or dark to bright, can indicate a change in condition or status of the electronic device 77.

The indicator light variation information 161 comprises variation information for each indicator light of the one or more indicator lights 123. The indicator light variation information 161 can comprise information on how an indicator light of the one or more indicator lights 123 varies over time. The time-wise variation can indicate a change in condition or status of the electronic device 77. The indicator light variation information 161 can include variation characteristics such as one or more of a variation period, a variation duty cycle, a variation sequence, a variation intensity range, and/or a variation color range. Each of these variation characteristics can individually indicate a change in condition or status of the electronic device 77. Alternatively, or in addition, the variation characteristics in various combinations or sub-combinations can indicate a change in condition or status of the electronic device 77.

The indicator light symbols 163 comprise symbols extracted or interpreted from the one or more indicator lights 123. The indicator light symbols 163 can include common symbols, specialized symbols, numbers, and/or text. The indicator light symbols 163 can be included in the indicated information 166. The indicator light symbols 163 can be extracted from the one or more indicator lights 123, such as where the one or more indicator lights 123 include an alphanumeric display. The alphanumeric display can comprise a static display or can comprise a dynamic display, such as where symbols scroll across the alphanumeric display. Alternatively, or in addition, the indicator light symbols 163 can be interpreted from the one or more indicator lights 123, such as where the one or more indicator lights 123 are operated in predetermined patterns or sequences. For example, the one or more indicator lights 123 may be illuminated in a sequence that indicates a critical measurement or operational value.

The indicated information 166 comprises information interpreted from the one or more device images 140. The indicated information 166 can include any manner of operational or status information for the electronic device 77.

In some examples, the light identification routine 135 analyzes the one or more device images 140 and generates the indicator light spatial information 152 and the indicator light quantity 154, while the light analysis routine 137 analyzes the one or more device images 140 and generates the indicator light color 155, the indicator light intensity 158, the indicator light variation information 161, and the indicator light symbols 163. However, it should be understood that generating and storing values or information can be performed by any of the routines of the indicator light interpretation device 100 and the combination above is merely one example.

The indicator light interpretation device 100 comprises a custom electronic device in one example. Alternatively, the indicator light interpretation device 100 can be integrated into another electronic device such as a camera, smartphone, portable computer or portable computerized device. Alternatively, the indicator light interpretation device 100 can comprise a mobile or fixed computer device that receives and processes images of electronic devices.

Figure 5:
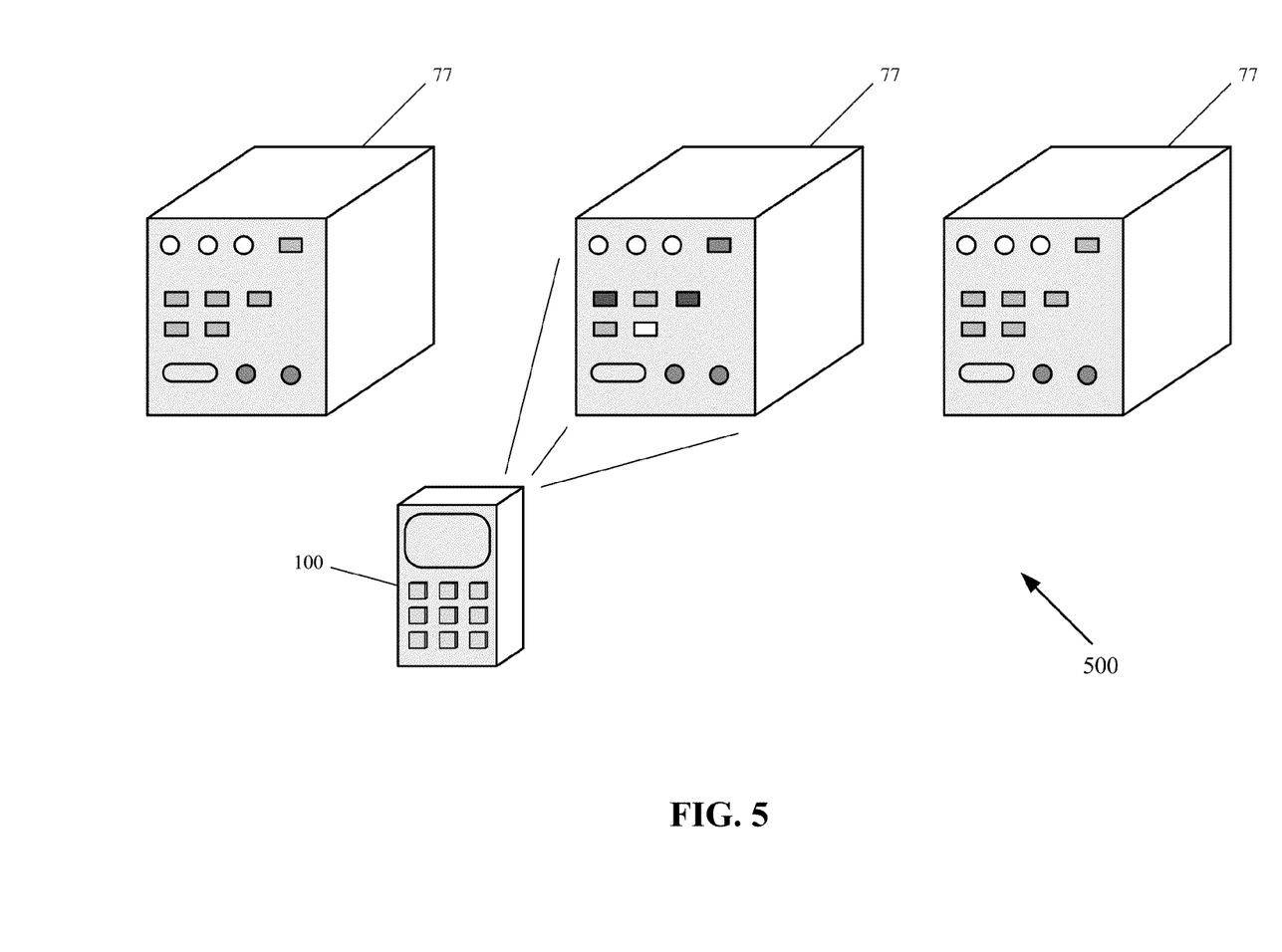
FIG. 5 shows an exemplary industrial automation environment.

FIG. 5 shows an exemplary industrial automation environment 500. The industrial automation environment 500 includes three electronic devices 77 in the example shown. The three electronic devices 77 comprise industrial automation control/monitoring devices, such as for monitoring or controlling industrial automation machines and/or processes. The industrial automation environment 500 further includes an indicator light interpretation device 100. The indicator light interpretation device 100 is being used to capture one or more images of the middle electronic device 77. The indicator light interpretation device 100 can then analyze the front panel of the middle electronic device 77 and generate an indicated information that includes information being conveyed by the indicator lights of the middle electronic device 77.

Figure 6:
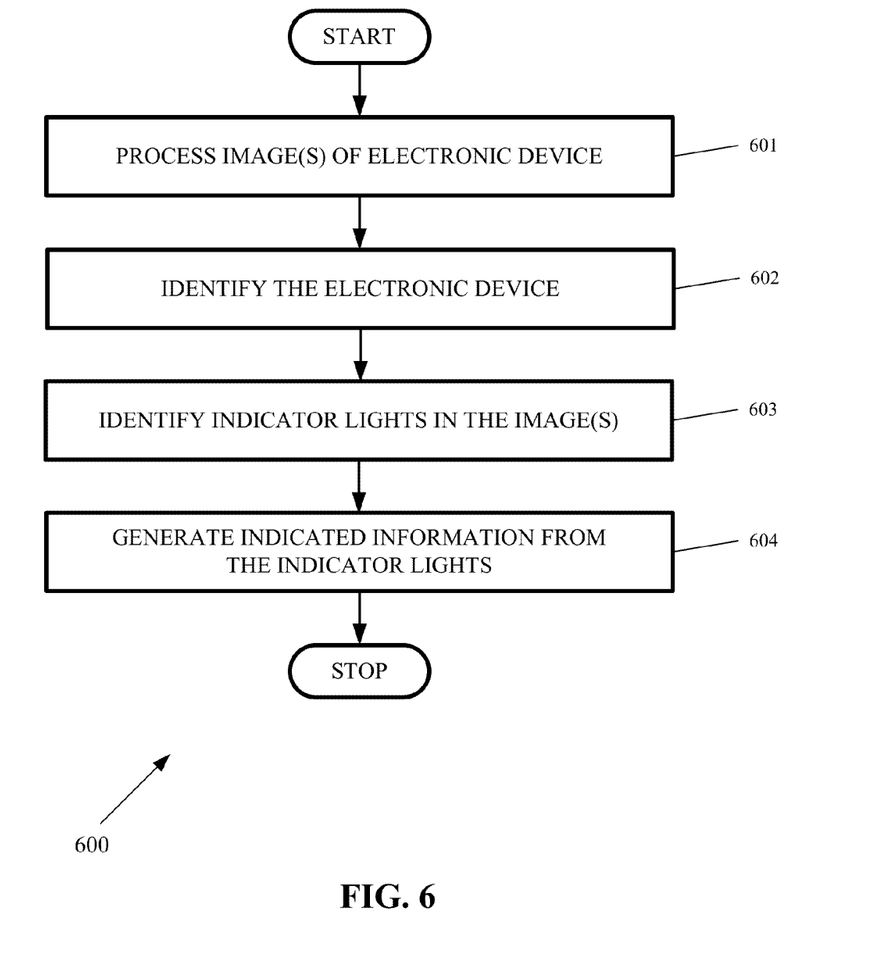
FIG. 6 is a flowchart of an exemplary indicator light interpretation method for indicator lights of an electronic device.

FIG. 6 is a flowchart 600 of an exemplary indicator light interpretation method for indicator lights of an electronic device. The method interprets one or more indicator lights of the electronic device. In some examples, the electronic device comprises an industrial automation device in an industrial automation environment, such as an electronic control device. In step 601, one or more device images of the electronic device are processed. The one or more device images include one or more indicator lights.

In step 602, the electronic device is identified from the one or more device images. The one or more device images can be compared to a library of known electronic devices in order to identify the electronic device. The library of known electronic devices includes device component information, such as component sizes, component locations, component types, and others. The device component information can be used to identify a variety of electronic devices.

In step 603, one or more indicator lights are identified in the one or more device images. The identifying can include identifying illuminated and non-illuminated indicator lights in the one or more device images. The identifying includes identifying indicator light spatial relationships in the one or more device images. The identifying includes identifying indicator light sizes in the one or more device images. The identifying includes identifying indicator light colors in the one or more device images. The identifying includes identifying indicator light intensities in the one or more device images. The identifying includes identifying indicator light variations in the one or more device images.

In step 604, indicated information for the electronic device is generated from the identified indicator lights. The indicated information comprises an interpretation of information conveyed by the one or more indicator lights. The indicated information comprises one indicated information set out of multiple possible indicated information sets (i.e., the one or more indicator lights can convey multiple different indicated information sets). The indicated information can take into account which indicator lights of the one or more indicator lights are illuminated. The indicated information can take into account the intensity or intensities of the one or more indicator lights. The indicated information can take into account the color or colors of the one or more indicator lights. The indicated information can take into account the pattern or patterns generated by the one or more indicator lights. The indicated information can take into account the variation or variations in the one or more indicator lights.

In some examples, the indicated information comprises industrial automation indicated information. The indicated information can include information such as machine or process characteristics, machine or process status, machine or process warning conditions, or any other industrial automation information.

The indicated information is provided to a human operator or technician. The indicated information can be displayed by an electronic device that processes the one or more device images and that generates the indicated information. The indicated information can be iteratively generate and provided to the operator.

The indicated information can be logged for future reference. The indicated information can be transmitted to other devices. The indicated information can be stored in any suitable storage media or presentation media.

Figure 7:
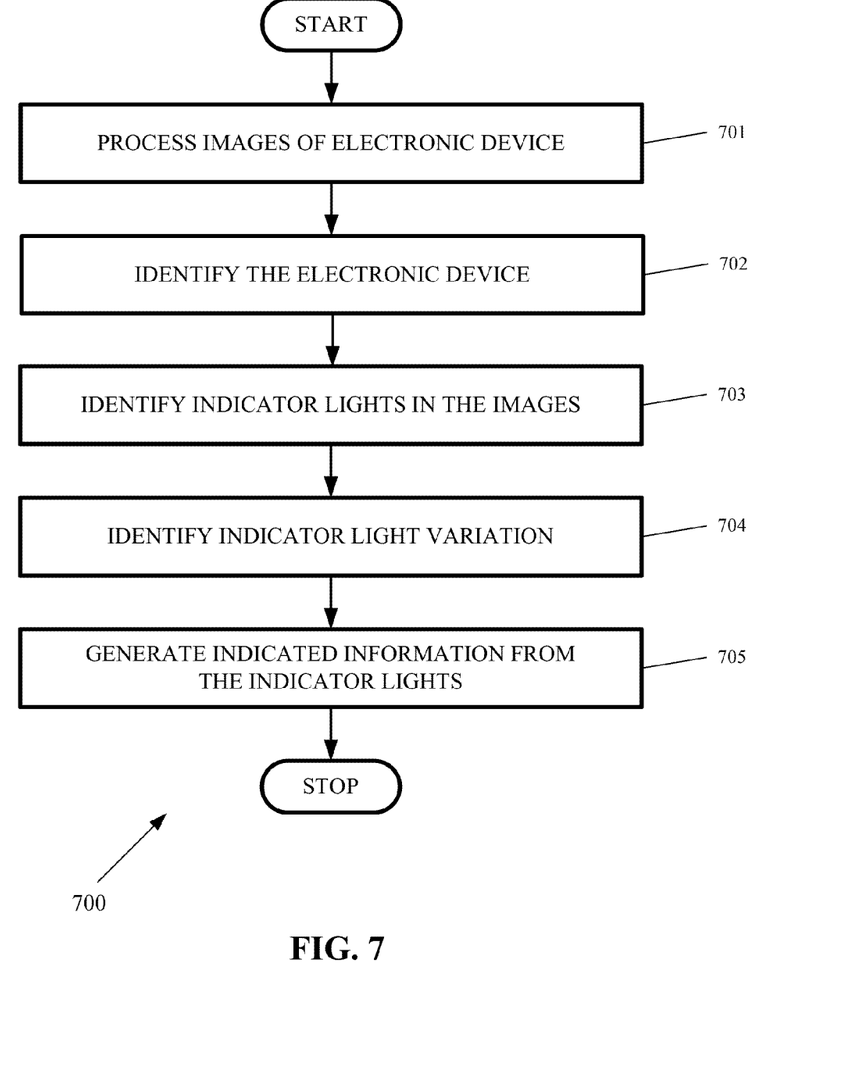
FIG. 7 is a flowchart of another exemplary indicator light interpretation method for indicator lights of an electronic device.

FIG. 7 is a flowchart 700 of another exemplary indicator light interpretation method for indicator lights of an electronic device. The method interprets one or more indicator lights of the electronic device. In some examples, the electronic device comprises an industrial automation device in an industrial automation environment, such as an electronic control device. In step 701, two or more device images of the electronic device are processed. The two or more device images include one or more indicator lights.

In step 702, the electronic device is identified from the two or more device images, as previously discussed, where the two or more device images can be compared to a library of known electronic devices in order to identify the electronic device.

In step 703, one or more indicator lights are identified in the two or more device images, as previously discussed.

In step 704, an indicator light variation is identified in the two or more device images. The variation identification can characterize a variation over time in the one or more indicator lights, as determined from the two or more device images. The two or more device images comprise images taken at predetermined or known time intervals or time periods. Consequently, the two or more device images can be used to determine whether variation exists in the one or more indicator lights. Further, the characteristics of the time-wise variation can be identified from the two or more device images.

The variation information can comprise information on how an indicator light of the one or more indicator lights 123 varies over time. The variation information can indicate a change in condition or status of the electronic device 77. The identified characteristics of the time-wise variation can include one or more of a variation period, a variation duty cycle, a variation intensity range, a variation color range, or a variation sequence. Each of these variation characteristics can individually indicate a change in condition or status of the electronic device 77. Alternatively, or in addition, the variation characteristics in various combinations or sub-combinations can indicate a change in condition or status of the electronic device 77.

In step 705, indicated information for the electronic device is generated from the identified indicator lights, as previously discussed, where the indicated information comprises an interpretation of information conveyed by the one or more indicator lights.

In some examples, the indicated information comprises industrial automation indicated information. The indicated information can include information such as machine or process characteristics, machine or process status, machine or process warning conditions, or any other industrial automation information.

The processing system 122 can comprise one or more microprocessors and other circuitry that retrieves and executes processing routines from the storage system 130. The processing system 122 can be implemented within a single processing device but can also be distributed across multiple processing devices or sub-systems that cooperate in executing program instructions. Examples of the processing system 122 include general purpose central processing units, application specific processors, and logic devices, as well as any other type of processing device, combinations, or variations thereof.

The processing system 122 can retrieve and execute the indicator light interpretation routine 132, the electronic device identification routine 134, the indicator light identification routine 135, and the indicator light analysis routine 137, with the processing routines 132, 134, 135, and 137 comprising computer programs, firmware, or other form of machine-readable processing instructions. The processing routines 132, 134, 135, and 137 may include an operating system, utilities, drivers, network interfaces, applications, virtual machines, or some other type of software. When executed by the processing system 122, the processing routines 132, 134, 135, and 137 direct the processing system 122 to operate the indicator light interpretation device 100 to perform indicator light interpretation functions, as described herein.

The processing routines 132, 134, 135, and 137 can include additional processes, programs, or components, such as operating system software, database software, or application software. The processing routines 132, 134, 135, and 137 can also comprise firmware or some other form of machine-readable processing instructions executable by the processing system 122. In at least one implementation, the processing instructions can include first processing instructions that direct the indicator light interpretation device 100 to exchange communications with the electronic device 77.

In general, the processing routines 132, 134, 135, and 137 can, when loaded into the processing system 122 and executed, transform the processing system 122 into a special-purpose computing system configured to exchange communications with one or more electronic devices 77, among other operations. Encoding the processing routines 132, 134, 135, and 137 on the storage system 130 can transform the physical structure of the storage system 130. The specific transformation of the physical structure can depend on various factors in different implementations of this description. Examples of such factors can include, but are not limited to the technology used to implement the storage media of the storage system 130 and whether the computer-storage media are characterized as primary or secondary storage. For example, if the computer-storage media are implemented as semiconductor-based memory, the processing routines 132, 134, 135, and 137 can transform the physical state of the semiconductor memory when the program is encoded therein. For example, the processing routines 132, 134, 135, and 137 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The interface 121 may include components that communicate over communication links, such as network cards, ports, RF transceivers, processing circuitry and software, or other communication components. The interface 121 may be configured to communicate over conductive, wireless, optical, or other links.

The interface 121 comprises components that interact with a user to receive user inputs and user communications and to present media and/or information. These components typically include a keyboard, display, indicator lights, speakers, touch pads, microphone, buttons, mouse, or other user input/output apparatus, including combinations thereof.

The interface 121 includes equipment and circuitry for receiving user input and control. Examples of the equipment and circuitry for receiving user input and control include graphical user interfaces, push buttons, touch screens, selection knobs, dials, switches, actuators, keys, keyboards, pointer devices, microphones, transducers, potentiometers, non-contact sensing circuitry, accelerometers, or other human-interface equipment.

The interface 121 also includes equipment to communicate information to a user of the indicator light interpretation device 100. Examples of equipment for communicating information to the user includes displays, graphical user interfaces, indicator lights, lamps, light-emitting diodes, haptic feedback devices, audible signal transducers, speakers, buzzers, alarms, vibration devices, or other indicator equipment, including combinations thereof.

The storage system 130 can comprise any computer readable storage media readable by the processing system 122 and capable of storing the indicator light interpretation routine 132, the electronic device identification routine 134, the indicator light identification routine 135, and the indicator light analysis routine 137, among other data. The storage system 130 may be independent from or integrated into the processing system 122. The storage system 130 can include volatile and nonvolatile, removable and non-removable media implemented in any method or technology for storage of information, such as computer readable instructions, data structures, program modules, or other data.

In addition to storage media, in some implementations the storage system 130 can also include communication media over which processing routines and/or data can be communicated. The storage system 130 can be implemented as a single storage device but can also be implemented across multiple storage devices or sub-systems co-located or distributed relative to each other. The storage system 130 can comprise additional elements, such as a controller, capable of communicating with the processing system 122. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

The indicator light diagnostic device 100 can comprise an access terminal, a smartphone, a telephone, a mobile wireless telephone, a personal digital assistant (PDA), a computer, an e-book, a mobile Internet appliance, a wireless network interface card, a media player, a game console, or some other wireless communication apparatus, including combinations thereof.

The indicator light diagnostic device 100 may include a transceiver for communicating over a wired or wireless link. The indicator light diagnostic device 100 can optionally receive information from the electronic device 77, such as identification information, manufacturer information, operational status information, or other information. The indicator light diagnostic device 100 can move among a plurality of electronic devices 77, wherein the electronic devices 77 do not have to be all of the same type or model.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. An indicator light interpretation device for indicator lights of an electronic device, comprising:
   a storage system configured to store one or more device images of the electronic device; and
   a processing system coupled to the storage system, with the processing system configured to process the one or more device images, with the one or more device images including one or more indicator lights, identify the electronic device from the one or more device images, identify one or more indicator lights in the one or more device images, and generate indicated information for the electronic device from the one or more indicator lights.

2. The indicator light interpretation device of claim 1, with the indicator light interpretation device further comprising one or both of an image sensor configured to generate the one or more device images or an interface configured to receive the one or more device images.

3. The indicator light interpretation device of claim 1, with the indicator light interpretation device comprising an industrial automation device and with the indicated information comprising industrial automation indicated information.

4. The indicator light interpretation device of claim 1, with identifying the one or more indicator lights further comprising identifying one or more of an indicator light spatial relationship, an indicator light quantity, an indicator light color or colors, or an indicator light intensity or intensities.

5. The indicator light interpretation device of claim 1, with identifying the one or more indicator lights further comprising identifying an indicator light variation.

6. The indicator light interpretation device of claim 1, with identifying the one or more indicator lights further comprising identifying an indicator light variation including one or more of a variation period, a variation duty cycle, a variation sequence, a variation intensity range, or a variation color range.

7. The indicator light interpretation device of claim 1, with identifying the one or more indicator lights further comprising identifying indicator light symbols.

8. The indicator light interpretation device of claim 1, with identifying the electronic device comprising matching the one or more device images to a library of device templates.

9. An indicator light interpretation method for indicator lights of an electronic device, comprising:
   in an indicator light interpretation device, processing one or more device images of the electronic device, with the one or more device images including one or more indicator lights;
   in the indicator light interpretation device, identifying the electronic device from the one or more device images;
   in the indicator light interpretation device, identifying the one or more indicator lights in the one or more device images; and
   in the indicator light interpretation device, generating indicated information for the electronic device from the one or more indicator lights.

10. The indicator light interpretation method of claim 9, with identifying the one or more indicator lights further comprising identifying one or more of an indicator light spatial relationship, an indicator light quantity, an indicator light color or colors, or an indicator light intensity or intensities.

11. The indicator light interpretation method of claim 9, with identifying the one or more indicator lights further comprising identifying an indicator light variation.

12. The indicator light interpretation method of claim 9, with identifying the one or more indicator lights further comprising identifying an indicator light variation including one or more of a variation period, a variation duty cycle, a variation sequence, a variation intensity range, or a variation color range.

13. The indicator light interpretation method of claim 9, with identifying the one or more indicator lights further comprising identifying indicator light symbols.

14. The indicator light interpretation method of claim 9, with the indicated information comprising industrial automation indicated information.

15. One or more computer-readable storage media having program instructions stored thereon for interpreting indicator lights on an electronic device that, when executed by a processing system, direct the processing system to at least:
   process one or more device images of the electronic device, with the one or more device images including one or more indicator lights and wherein the one or more device images comprise images captured at predetermined time intervals;
   identify the electronic device from the one or more device images;
   identify the one or more indicator lights in the one or more device images; and
   generate operational status information for the electronic device from the one or more indicator lights.

16. The non-transitory computer-readable medium of claim 15, with the instructions further directing the processing system to identify one or more of an indicator light spatial relationship, an indicator light quantity, an indicator light color or colors, or an indicator light intensity or intensities.

17. The non-transitory computer-readable medium of claim 15, with the instructions further directing the processing system to identify an indicator light variation.

18. The non-transitory computer-readable medium of claim 15, the instructions further directing the processing system to identify an indicator light variation including one or more of a variation period, a variation duty cycle, a variation sequence, a variation intensity range, or a variation color range.

19. The non-transitory computer-readable medium of claim 15, the instructions further directing the processing system to identify indicator light symbols.

20. The non-transitory computer-readable medium of claim 15, with the indicated information comprising industrial automation indicated information.

* * * * *